(No Model.)
F. S. OSBORN.
Horse Poke.
No. 237,893.  Patented Feb. 15, 1881.
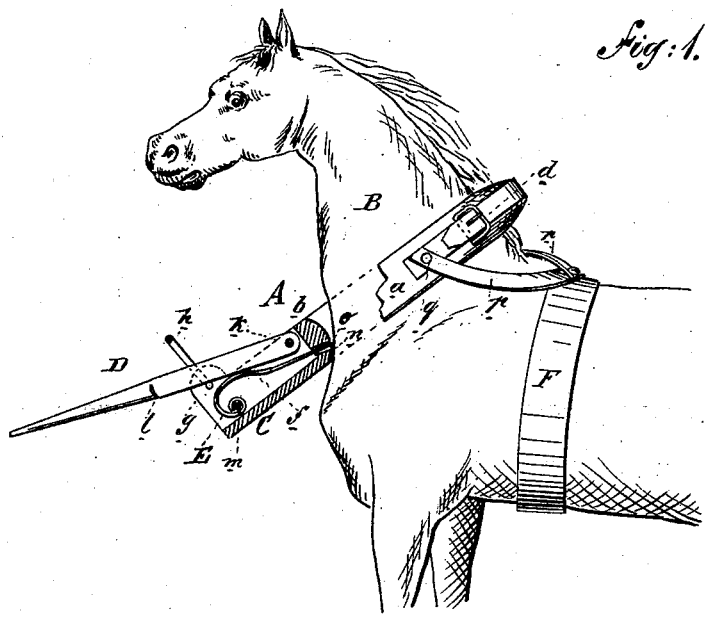
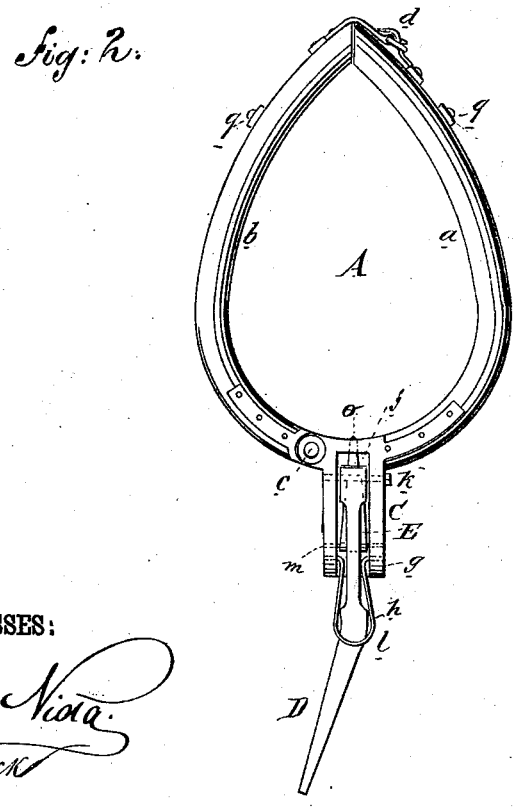
WITNESSES:
Chas. Nida
C. Sedgwick
INVENTOR:
F. S. Osborn
BY Munn & Co
ATTORNEYS.
N. PETERS, PHOTO-LITHOGRAPHER, WASHINGTON, D. C.

UNITED STATES PATENT OFFICE.

FRANK S. OSBORN, OF BOLIVAR, NEW YORK.

HORSE-POKE.

SPECIFICATION forming part of Letters Patent No. 237,893, dated February 15, 1881.

Application filed July 30, 1880. (No model.)

*To all whom it may concern:*

Be it known that I, FRANK S. OSBORN, of Bolivar, Allegany county, State of New York, have invented a new and Improved Horse-Poke, of which the following is a specification.

The object of this invention is to provide a poke to fit a horse of any size, and to effectually prevent him from jumping fences, while it will not interfere with his feeding, nor ride upon his neck or head, as is the case with pokes of the usual construction.

The invention consists of an adjustable sectional collar that is held in place upon the horse by suitable bands or straps and has a forward and upward projecting pivoted bar or stale whose butt rests on a sharp-pointed spring that is made to pierce the horse's breast when the free end of said stale is pressed downward by contact with a fence or other object.

Figure 1 represents the poke, partly in section, in place on a horse; and Fig. 2 is an enlarged plan of the poke.

Similar letters of reference indicate corresponding parts.

In the drawings, A represents the poke. (Shown in Fig. 1 in position on the horse B.) The poke A consists of two curved bows, *a b*, respectively hinged together at the front, as shown at *c*, so as to open laterally, and held together at the rear or apex of the poke A by strap and buckle *d*, or other suitable device after the manner of an ordinary horse-collar. An oblong projection, C, having a vertical opening, *f*, of the same shape through it, extends forward from the front of said bow *a*, from the central front point of the poke A, and at its forward end is provided on either side with an upward-projecting lug, *g*, which lugs *g g* support a staple or yoke, *h*, that projects upward and restricts the upward movement of the stale or bar D. Said stale D is pivoted at its butt within the opening *f* on the pin *k*, that is passed transversely through the sides of the projection C, and the point or tip of said stale D projects forward for about two-thirds of its length in front of said projection C, passing out beneath the yoke *h*. In order not to interfere with the horse's feeding, the projecting portion of said stale D is bent sidewise, as shown at *l*.

Secured on a pin, *m*, that passes transversely through the opening *f*, is a curved spring, E, whose sharp free point *o* extends rearward through an opening, *n*, to the inside of the bow *a* on the central longitudinal line of said poke A.

Around the belly of the horse B is secured the poke-band F, of leather or other flexible material, while the poke A itself is placed over the horse's neck, and, resting against his shoulders, is then held in place by the straps *p p*, that are fastened together at one end to the band F on the back of the horse B, while their other ends are spread apart and fastened respectively to the bows *a b* of the poke A on the bolts, hooks, or pins *q q*.

When the poke A is in place on the horse, as shown in Fig. 1, should the horse raise his fore quarters to jump a fence, the tip of the stale D will come in contact with the fence and be pressed down upon the spring E, and, compressing said spring E, will force the point *o* thereof through the opening *n* into the breast of the horse B and prick the horse so that he will desist from the attempt to jump the fence.

Being secured to the band F, as shown, the poke A will always remain in place and not ride up on the neck or head of a horse, and the stale D, being bent aside, as shown, will not interfere with the horse, when feeding, while the yoke *h* prevents the displacement of the stale D when said stale D is brought in contact with the ground while the horse is feeding. In all these respects the device has advantages over the poke in common use.

Having thus described my invention, I claim as new and desire to secure by Letters Patent—

A horse-poke constructed substantially as herein shown and described, consisting of hinged curved bows *a b*, connected by strap and buckle *d*, open projection C, pivoted bent stale D, and pointed spring E, as set forth.

FRANK S. OSBORN.

Witnesses:
 ALEX. SMITH,
 S. F. LINDSAY.